United States Patent [19]

Levionnais

[11] Patent Number: 5,818,297
[45] Date of Patent: Oct. 6, 1998

[54] DIGITAL DEMODULATOR FOR A PHASE-MODULATED SIGNAL

[75] Inventor: Philippe Levionnais, Caen, France

[73] Assignees: France Telecom, Paris; La Poste, Boulogne Billancourt Cedex, both of France

[21] Appl. No.: 855,189

[22] Filed: May 13, 1997

[30] Foreign Application Priority Data

May 15, 1996 [FR] France .................................. 96 06080

[51] Int. Cl.$^6$ .................................................. H04L 27/22
[52] U.S. Cl. .......................... 329/304; 329/307; 375/327; 375/328
[58] Field of Search .................................... 329/304, 305, 329/306, 307; 375/324, 327, 328

[56] References Cited

U.S. PATENT DOCUMENTS

| 4,667,334 | 5/1987 | Collec et al. | 375/116 |
| 5,150,070 | 9/1992 | Rinaldi et al. | 329/310 |
| 5,182,760 | 1/1993 | Montgomery | 375/52 |

OTHER PUBLICATIONS

International Conference on Communications, Including Supercomm Technical Sessions. Atlanta, Apr. 15–19, 1990, vol. 2 of 4, 15 Apr. 1990, Institute of Electrical and Electronics Engineers, pp. 365–369, XP000146095 Tomoki Ohsawa: "Wide Range and Short Time Pull–in Coherent Demodulation Method for PSK Signal—Ace–Demo—".

*Primary Examiner*—Siegfried H. Grimm
*Attorney, Agent, or Firm*—Marshall, O'Toole, Gerstein, Murray & Borun

[57] ABSTRACT

The demodulator is for processing a signal having a carrier modulated by $(0, \pi)$ phase shifts and sampled at a rate that is at least twice the frequency of the carrier co. It comprises, in cascade: a first multiplier for squaring successive samples $e(t)$, a phase locked loop adjusted to the frequency of the carrier, thereby performing programmable digital filtering; a divider for dividing the frequency by two, reconstituting the carrier from the output of the phase locked loop; a second multiplier receiving the sampled input signal and the output signal from the divider and an output lowpass digital filter. A phase adjustment circuit is placed upstream of one of the inputs of the second multiplier.

5 Claims, 1 Drawing Sheet

DIGITAL DEMODULATOR FOR A PHASE-MODULATED SIGNAL

The present invention relates to a digital demodulator for a signal having a carrier that is modulated by phase shifts, and a major application therefor lies in numerous transmission fields. The invention applies particularly to demodulating signals transmitted by telephone line and coming from modems, which signals are on/off modulated, i.e. by phase shifts of 0 or $\pi$.

At present, conventional demodulators included in commercially-available modems process signals in analog manner. They have one or more printed circuits carrying discrete electronic components. The modem constitutes an independent appliance to be added to those that already take up space in workshops and offices that make use of computers.

Digital demodulators are also known in the form of separate appliances.

The present invention seeks in particular to provide a demodulator whose essential components can be implemented by making use of resources available in an existing microcomputer.

To this end, the invention provides a digital signal demodulator comprising, in cascade:
- a first multiplier for squaring successive samples $e(t)$, delivering an output signal that is insensitive to variations in the phase of the input signal;
- a phase locked loop adjusted to the frequency of the carrier and performing programmable digital filtering having a Z transfer function of the form:

$$H(z) = Y(z)/X(z)$$
$$= \prod_{i=1}^{m} (n_{i2}z^2 + n_{i1}z + n_{i0})/(d_{i2}z^2 + d_{i1}z + d_{i0})$$

for polynomials of order $i$ that is even, and of the form:

$$[(p_1z+p_0)/(q_1z+q_0)]H(z)$$

for odd orders, where $m$ lies in the range 2 to 20, and where the values $n$, $d$, $p$, and $q$ are constants;
- a divide-by-two frequency divider reconstituting the carrier from the output of the phase locked loop;
- a second multiplier receiving the sampled input signal $e(t)$ and the output signal from the divider, with a phase adjusting circuit being placed upstream from the second multiplier on one of its inputs; and
- an output lowpass digital filter.

The above-defined components can be implemented by programs implanted in a microcomputer or in a server computer. The means additional to those already existing in the computer can easily be provided on an acquisition card insertable in an available slot in the microcomputer or the server computer. These means that need to be added are relatively minor and can be of low cost.

The above characteristics and others appear more clearly on reading the following description of a particular embodiment, given by way of non-limiting example. The description refers to the accompanying drawings, in which.

Figure 1:
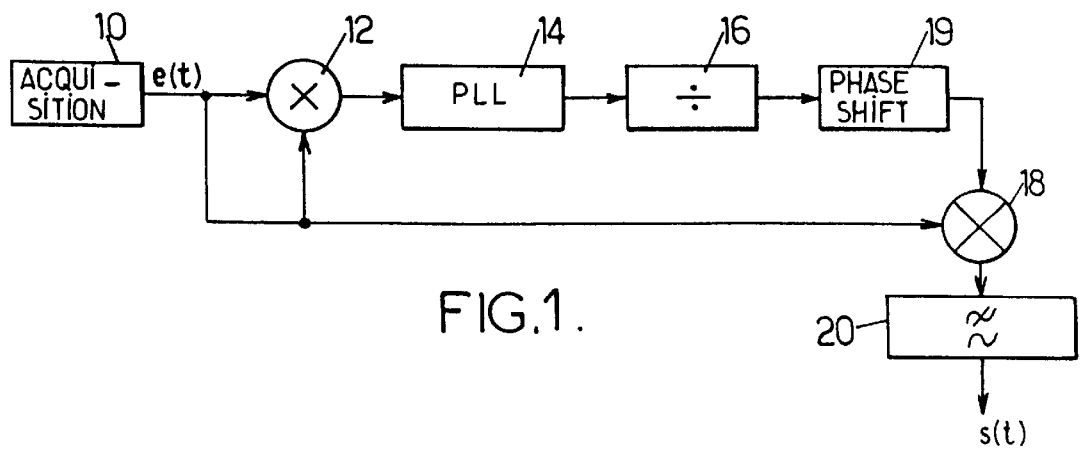
FIG. 1 is a block diagram of the demodulator.

The demodulator whose block diagram is given in FIG. 1 is placed downstream from an acquisition circuit 10 which samples the input analog signal and digitizes it. The sampling frequency 1/Te is at least twice the 10, there appears a sequence of digitized samples $e(t)$.

The input member of the demodulator is a multiplier 12 that squares the signal $e(t)$. It receives the same samples on both inputs and it provides an output signal equal to $e(t) \times e(t)$ whose phase is always equal to 0 or $2\pi$. The input phase is 0 or $\pi$ when the signal is on/off modulated.

This squared signal is insensitive to phase variations in the input signal $e(t)$.

To reconstitute the carrier, the squared signal is applied to a phase locked loop 14 acting as a programmed filter that restores a signal in phase with $e(t) \times e(t)$ or with one of its components.

The transfer function of the phase locked loop 14 is selected so as to constitute a compromise between contradictory requirements. A steep-sided filter serves to increase selectivity, taking account of the high number of successive samples in the transfer function. However the loop then runs the risk of lacking stability, and complexity increases. The number $m$ is selected in the range 2 to 20, and in practice a value is selected lying in the range 2 to 10. In many cases, a value lying in the range 2 to 4 gives satisfactory results.

As mentioned above, the invention has the advantage of being implemented easily on a microcomputer such as a personal computer, by programming that is relatively simple. For this purpose, it suffices to write a program that implements a Z transform, starting from the desired transfer function in $s$ and using the bilinear transform with preliminary shifting, which is itself well known.

The Z transform must be different for even-order polynomials and for odd-order polynomials. For even orders, the following can be written:

$$H(z) = Y(z)/X(z)$$
$$= \prod_{i=1}^{m} (n_{i2}z^2 + n_{i1}z + n_{i0})/(d_{i2}z^2 + d_{i1}z + d_{i0})$$

The coefficients $n_0, n_1, n_2, \ldots$, and $d_0, d_1, d_2, \ldots$ are constants selected as a function of the desired characteristics, depending on the nature of the input signal (and in particular on the phase transition rate), and on the capture range required for taking account of the nature of the input signal and of noise.

These coefficients are also selected so that the poles of the filter satisfy the usual stability criteria.

For odd-order polynomials, the order is reduced to an odd value by multiplying through by a term of the form:

$$(p_1z+p_0)/(q_1z+q_0)$$

where $p_1$, $p_0$, $q_1$, and $q_0$ are constants.

It can be seen that the program to be implemented does not exceed the real time computation capacity of a personal computer of the type that is presently available, and that the number of samples involved in the computation can be small enough to ensure that the delay due to processing in the phase lock loop is acceptable, even for telephone transmission of speech.

Since the frequency of the signal is doubled by squaring it, division by two is necessary to find the carrier frequency.

This division can also be performed by computation by constructing a function that can be said to be asymptotic to the signal present at the input and by doubling the period of said function.

For this purpose, FIG. 1 shows a digital frequency divider 16 which in most cases is, in fact, constituted by a zero comparator and by a computation program.

The modulating signal is restored by a multiplier 18 that receives both the output from the frequency divider 16 and the sampled input signal e(t). The multiplier 18 merely multiplies corresponding samples together and it can be constituted by a simple program.

The phase locked loop 14 adds a delay that must be compensated. One simple solution consists in providing a phase shifter 19 between the frequency divider 16 and the multiplier 18. The phase shifter is designed to shift through an appropriate number of samples and it can be implemented in the form of a memory organized as a queue of appropriate length.

The output signal from the multiplier 18 includes residual components at the frequency of the carrier and of its harmonics. This interference can be eliminated by a lowpass filter 20 that may be of simple structure, since the frequency of the modulating signal is generally far removed from the frequency of the carrier. The digital filter 20 can be synthesized in the form of software by a method similar to that used for synthesizing the phase locked loop 14.

Figure 2:
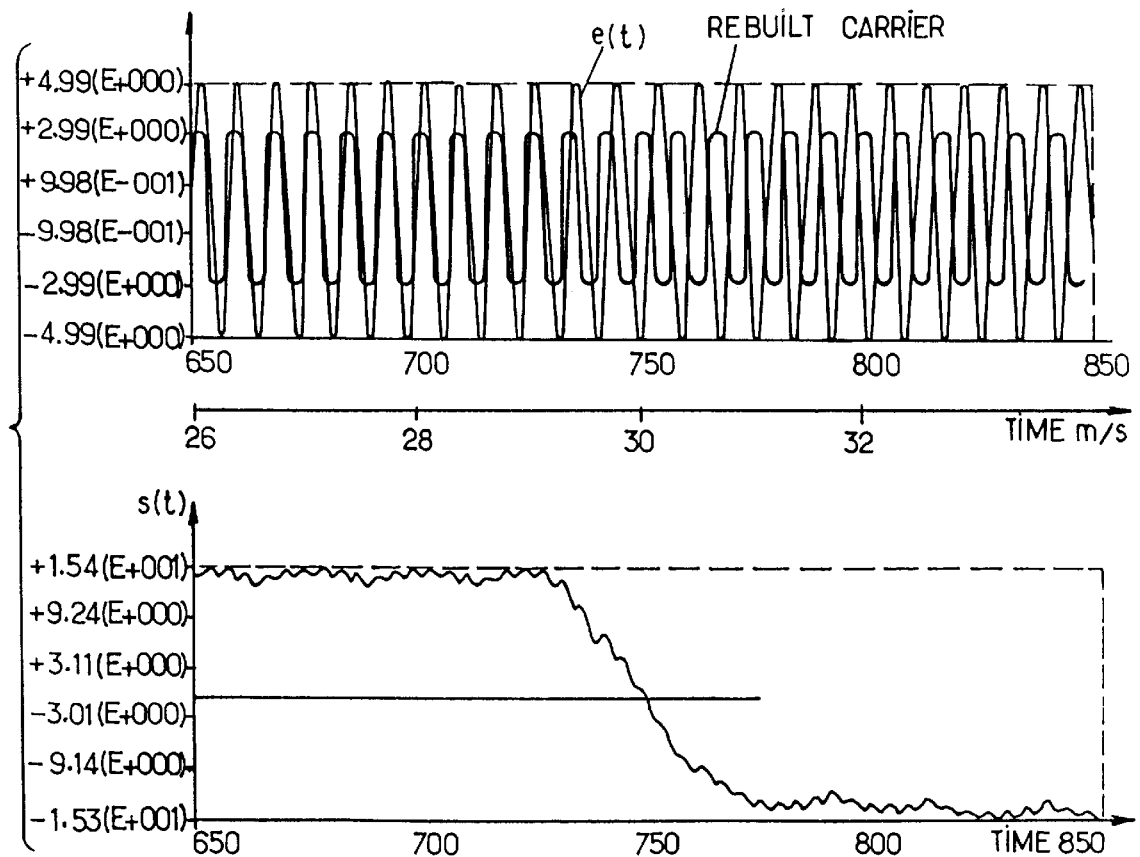
FIG. 2 is a diagram showing an example of a modulated input signal and of a demodulated output signal.

By way of example, FIG. 2 shows the results obtained by demodulating a 4 kHz carrier modulated at 300 baud. The upper graph of FIG. 2 shows the modulated input signal e(t) and the carrier signal reconstituted by the digital method, as it appears at the output from the divider 16. The lower graph shows how the demodulated output signal s(t) appears at the output from the filter 20.

By way of example, the characteristics of a demodulator applicable to demodulating a carrier modulated by a signal coming from a telephone line and received by an acoustic coupler are given below. In such a signal, phase rotation between 0 and $\pi$ does not take place instantaneously, and the phase locked loop 14 must have a transfer function so as to be capable of discriminating between modulation and any effect comparable to a Doppler effect, for example the inertia of a loudspeaker when dealing with an acoustic coupler.

The Z transform can therefore be of the form:

$$H(z)=(0.004\ z^2-0.00993\ z+0.00496)/(z^4-0.245\ z^3+1.92\ z^2-0.234\ z+0.913)$$

To synthesize a digital filter implementing the above transform, it is possible to use a difference equation which can be written, using conventional notation and writing $10^{-r}$ as (E-r), as follows:

$$Y[j] = (1.0/D4)*(N4*X[j] + N3*X[j-1] + N2*X[j-2] + \qquad (1)$$
$$N1*X[j-3] + N0*X[j-4] - D3*Y[j-1] - D2*Y[j-2] -$$
$$D1*Y[j-3] - D0*Y[j-4])$$

with:

$$N4 = 0, N3 = 0, N2 = 4.96(E-3), N1 = 0.93(E-3), \qquad (2)$$
$$N0 = 4.96(E-3), D4 = 1.00(E+0), D3 = 2.45(E-1),$$
$$D2 = 1.92(E+0), D1 = 2.34(E-1), D0 = 0.13(E-1)$$

with, as initial conditions:

$$Y[0]=Y[1]=Y[2]=Y[3]=0.0 \qquad (3)$$

with a value m=4 apparently constituting an acceptable compromise in this case.

The output filter 20 may be synthesized by using the following difference equation, which enables the cutoff frequency of 4 kHz to be obtained:

$$Y[j] = (1.0/D2)*(-D1*Y[j-1] + N2*X[j] + N1*X[j-1])$$

with $D2 = (Te + 2*T1)$, $D1 = (Te - 2*T1)$, $D0 = 0.0$ $N2 = Te$, $N1 = Te$, $N0 = 0.0$ $Te = 40(E-6)$, $T1 = 5.1(E-9)$ and, as initial conditions, $Y[0] = 0.0$, $Y[1] = 0.0$.

As mentioned above, the digital demodulator may include an acquisition card providing sampling functions and including, in programmable read-only memory, programs for implementing the above-defined functions, with the necessary computation being performed by the central unit of the computer (microcomputer, personal computer, or even general purpose computer).

I claim:

1. A digital demodulator for demodulating an input signal having a carrier at a predetermined frequency modulated by phase shifts of $(0, \pi)$ and sampled at a rate that is at least twice the frequency of the carrier for providing successive samples e(t), comprising, in cascade:

a first multiplier for squaring successive samples e(t) and delivering an output signal that is insensitive to variations in the phase of the input signal;

a phase locked loop adjusted to the frequency of the carrier and arranged to perform programmable digital filtering having a Z transfer function of the form:

$$H(z) = Y(z)/X(z)$$
$$= \left( \prod_{i=1}^{m} \right) (n_{i2}z^2 + n_{i1}z + n_{i0})/(d_{i2}z^2 + d_{i1}z + d_{i0})$$

for polynomials having orders $\underline{i}$ that are even, and $$[(p_1z+p_0)/(q_1z+q_0)]H(z)$$

for odd orders, where $\underline{m}$ is an integer in the range 2 to 20, and where $\underline{n}$, $\underline{d}$, $\underline{p}$, and $\underline{q}$ are constant values;

a divide-by-two frequency divider connected to receive an output of the phase locked loop, for reconstituting the carrier from said output;

a second multiplier connected to receive the samples of the input signal e(t) and to receive the output signal from the divider;

a phase adjusting circuit placed upstream from the second multiplier on one of the inputs thereof; and an output lowpass digital filter.

2. A demodulator according to claim 1, wherein in that the frequency divider is arranged to reconstitute the carrier by detecting zero crossings and by generating squarewaves at the frequency twice the frequency of the carrier.

3. A demodulator according to claim 1, characterized in that the output lowpass digital filter is synthesized by a programmed digital filter.

4. A demodulator according to claim 1, wherein $\underline{m}$ is in the range 2 to 10.

5. A demodulator according to claim 4, wherein $\underline{m}$ is in the range 2 to 4.

* * * * *